(12) United States Patent
Ewens et al.

(10) Patent No.: US 10,189,575 B2
(45) Date of Patent: Jan. 29, 2019

(54) AIRCRAFT ENGINE ASSEMBLY COMPRISING REAR ENGINE ATTACHMENTS IN THE FORM OF SHACKLES

(71) Applicant: Airbus Operations SAS, Toulouse (FR)

(72) Inventors: David Ewens, Merville (FR); Jonathan Blanc, Blagnac (FR); Yves Belloc, Bondigoux (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 299 days.

(21) Appl. No.: 15/357,106

(22) Filed: Nov. 21, 2016

(65) Prior Publication Data

US 2017/0152052 A1  Jun. 1, 2017

(30) Foreign Application Priority Data

Nov. 27, 2015  (FR) ..................... 15 61516

(51) Int. Cl.
*B64D 27/26* (2006.01)
*B64C 3/32* (2006.01)
*B64D 27/18* (2006.01)

(52) U.S. Cl.
CPC ............... *B64D 27/26* (2013.01); *B64C 3/32* (2013.01); *B64D 27/18* (2013.01); *B64D 2027/264* (2013.01); *B64D 2027/266* (2013.01); *B64D 2027/268* (2013.01)

(58) Field of Classification Search
CPC .. B64D 27/26; B64D 27/18; B64D 2027/266; B64D 2027/268; B64D 2027/264; B64C 3/32
See application file for complete search history.

(56) References Cited

U.S. PATENT DOCUMENTS

| 5,238,206 A | 8/1993 | Pachomoff |
| 2007/0138337 A1* | 6/2007 | Audart-Noel .......... B64D 27/26 244/53 R |
| 2009/0183512 A1 | 7/2009 | Suciu et al. |

(Continued)

FOREIGN PATENT DOCUMENTS

| EP | 0527672 | 2/1993 |
| EP | 2080879 | 7/2009 |
| FR | 3014840 | 6/2015 |

OTHER PUBLICATIONS

French Search Report, dated Jul. 19, 2016, priority document.

*Primary Examiner* — Valentina Xavier
(74) *Attorney, Agent, or Firm* — Greer, Burns & Crain, Ltd.

(57) ABSTRACT

An aircraft engine assembly including a set of rear engine attachments comprising a first shackle hinged on a bracket secured to the engine and on a bracket made as one piece with one of the two side panels, the shackle being oriented along a vertical direction, a second shackle hinged on a bracket secured to the engine and on a bracket made as one piece with the other one of the two side panels, the second shackle being oriented along the vertical direction, and a third shackle for transversally transmitting loads, inclined relative to the vertical direction and hinged on a bracket secured to the engine and on a bracket secured to the primary structure.

16 Claims, 4 Drawing Sheets

(56) References Cited

U.S. PATENT DOCUMENTS

| | | | |
|---|---|---|---|
| 2009/0212155 A1 | 8/2009 | Huggins et al. | |
| 2014/0183298 A1* | 7/2014 | Brochard | B64D 27/26 244/54 |
| 2014/0373555 A1* | 12/2014 | Beier | F02C 7/20 60/796 |
| 2015/0197341 A1 | 7/2015 | Ewens et al. | |
| 2015/0251774 A1* | 9/2015 | Mercier | F01D 25/285 29/281.1 |
| 2017/0240288 A1* | 8/2017 | Pautis | B64D 27/16 |

\* cited by examiner

US 10,189,575 B2

AIRCRAFT ENGINE ASSEMBLY COMPRISING REAR ENGINE ATTACHMENTS IN THE FORM OF SHACKLES

CROSS-REFERENCES TO RELATED APPLICATIONS

This application claims the benefit of the French patent application No. 1561516 filed on Nov. 27, 2015, the entire disclosures of which are incorporated herein by way of reference.

BACKGROUND OF THE INVENTION

The present invention relates to the sector of aircraft engine assemblies comprising an engine, an engine mounting pylon and means for mounting the engine on a primary structure of the mounting pylon.

The invention also relates to an aircraft equipped with such an engine assembly. It is applicable preferably to commercial aircraft.

In existing aircraft, engines such as turbojet engines are suspended underneath the wing by complex mounting devices, also called "EMS" (engine mounting structures), or also mounting pylons. The mounting devices usually employed have a rigid structure, called a primary structure. This primary structure forms a box, namely, it is formed by the assembly of lower and upper spars joined together by a plurality of transverse stiffening ribs situated inside the box. The spars are arranged along top and bottom faces, while side panels close the box along side faces.

In a known manner, the primary structure of these pylons is designed to allow the transmission, to the wing, of the static and dynamic loads generated by the engines, such as the weight, the thrust or the different dynamic loads.

In the known solutions of the prior art, the transmission of the loads between the engine and the primary structure is conventionally ensured by mounting means comprising a front engine attachment, a rear engine attachment and a device for transmission of the thrust loads. A conventional example of construction of the rear engine attachment is shown in FIG. 1.

This rear engine attachment 7a connects the exhaust casing of the engine to the primary structure 6 of the mounting which is in the form of a box. For this purpose, the attachment 7a comprises a body 100 as well as a plurality of shackles 102 hinged on the engine attachment body and on the exhaust casing. More precisely, the body 100 comprises two tiers of beams stacked in the vertical direction. These comprise one or more upper beams 104, fixed by means of bolts onto the outer face of the lower spar closing the box 6, and one or more lower beams 106, fixed by means of bolts to the upper beams 104. It is this lower beam which carries, in a hinged manner, the shackles 102. More commonly, the upper beams are called "intermediate fittings," while generally a single lower beam, more commonly called "engine beam," is generally employed. It is pointed out that, during disassembly of the engine, for example in order to carry out maintenance operations, separation is performed in the region of the interface—indicated by 108—situated between the upper beams which remain fixed to the box 6, and the lower beam which remains fixed to the engine via the shackles 102.

Although this solution has proved to be satisfactory in many respects, there is still room for improvement. In particular, there exists the need to reduce its overall mass and/or to improve the transfer of loads between the engine and the primary structure of the mounting pylon.

SUMMARY OF THE INVENTION

An object of the invention is to propose an aircraft assembly which solves, at least partially, the aforementioned problems encountered in the solutions of the prior art.

To achieve this, the invention relates to an aircraft engine assembly comprising an engine, a pylon for mounting the engine on a structure of the aircraft, the pylon comprising a primary structure forming a box formed by lower and upper spars joined together by a plurality of transverse stiffening ribs situated inside the box, the latter being closed laterally by two side panels, the engine assembly further comprising means for mounting the engine on the primary structure of the mounting pylon.

According to the invention, the mounting means include a set of rear engine attachments comprising:

a first shackle hinged at one of its ends on a bracket secured to the engine and hinged at the other end on a bracket formed as one piece with one of the two side panels closing the box, the first shackle being oriented along a vertical direction of the engine assembly and hinged on its associated brackets along hinging axes oriented along a transverse direction of the engine assembly;

a second shackle hinged at one of its ends on a bracket secured to the engine and hinged at the other end on a bracket made as one piece with the other one of the two side panels closing the box, the second shackle being oriented along the vertical direction of the engine assembly and hinged on its associated brackets along hinging axes oriented along the transverse direction of the engine assembly, the first and second shackles being arranged so as to be crossed by a vertical and transverse plane of the engine assembly; and a third shackle for transverse transmission of the loads, inclined relative to the vertical direction and crossed by the vertical and transverse plane, the third shackle being hinged at one of its ends on a bracket secured to the engine and hinged at the other end on a bracket secured to the primary structure of the pylon.

The invention is noteworthy in that it allows more efficient and more direct transfer of the loads from the engine and in the direction of the primary structure of the pylon, owing to the aforementioned shackles. The arrangement proposed, in particular, allows better distribution of the load on the box-shaped primary structure by stressing the side panels more, owing to the direct introduction of loads in these side panels. This advantage relating to the improvement of the load transfer is achieved in addition to the advantage of a reduction in the overall mass of the set of rear engine attachments. In fact, vertical stacking of transverse beams, as occurs in the constructional solutions of the prior art, is no longer required, and it is no longer necessary to reinforce mechanically the structural components at their interfaces joined by bolts.

The invention has preferably at least one of the following optional characteristics, considered in isolation or in combination.

The third shackle is inclined at about 30° to 60° relative to the vertical direction.

The third shackle is hinged on its associated brackets along hinging axes oriented along a longitudinal direction of the engine assembly.

For each of the first and second shackles, the end which is hinged on the bracket made as one piece with the associated side panel is also hinged on an additional bracket secured to the primary structure of the pylon, the bracket and the additional bracket facing each other so as to form a clevis.

The additional bracket is made as one piece with one of the transverse stiffening ribs of the box. Alternatively, it may be mounted in a fixed manner on this rib.

The bracket secured to the primary structure of the pylon, on which the third shackle is hinged, is made as one piece with one of the transverse stiffening ribs of the box, and preferably is in the form of a clevis. Here also, this bracket may alternatively be mounted in a fixed manner on the rib.

The first, second and third shackles are joined to an exhaust casing of the engine.

The set of rear engine attachments also comprises at least one safety shackle which is only stressed in the event of a faulty condition affecting at least one of the first, second and third shackles. Owing to this feature it is possible to obtain what is known as a "fail safe" function for transmission of the loads, in the event of damage to any one of the first, second and third shackles intended to transmit these same loads under normal operating conditions.

For example, at least one safety shackle intersects the third shackle, so as to form an X-shaped assembly in rear view.

The mounting means also comprise a front engine attachment as well as a device for transmission of the thrust loads oriented along the longitudinal direction of the engine assembly.

Preferably, the set of rear engine attachments, the front engine attachment and the thrust load transmission device are engine mounting means forming an isostatic load transmission system.

The thrust load transmission device comprises:

a support element fixed to the box, on the outside of the latter;

two side rods for transmission of the thrust loads; and a rudder bar hinged on the support element, the two side rods being hinged on the two opposite ends of the rudder bar, respectively.

The support element is arranged at the front in relation to the set of rear engine attachments. Alternatively, it could be incorporated in this set of rear engine attachments.

The engine is a twin-shaft turbofan engine.

Finally, the invention also relates to an aircraft comprising at least one engine assembly such as that described above.

Further advantages and characteristic features of the invention will become clear from the non-limiting detailed description below.

BRIEF DESCRIPTION OF THE DRAWINGS

This description will be provided with reference to the attached drawings, in which.

DETAILED DESCRIPTION OF THE PREFERRED EMBODIMENTS

Figure 1:
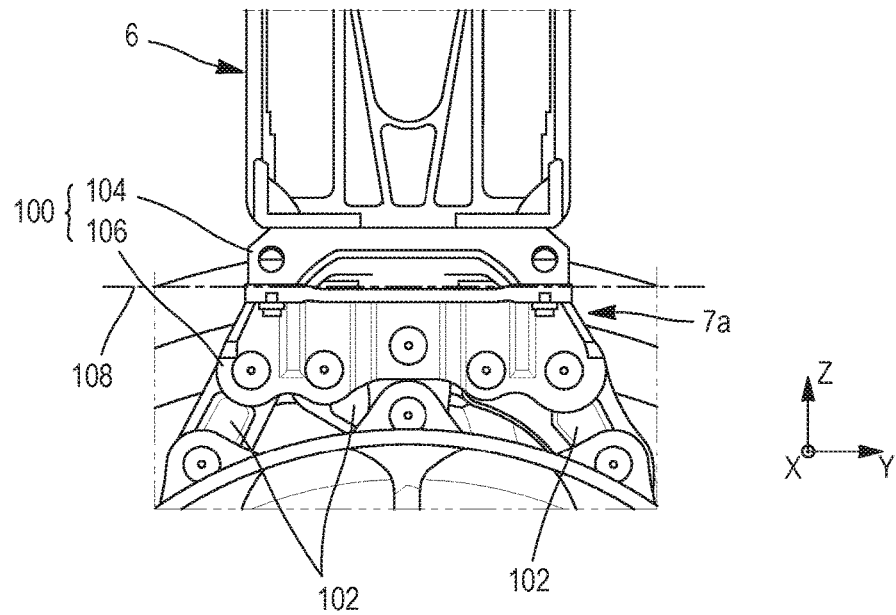
FIG. 1, already described, shows an aircraft engine assembly according to the prior art comprising a mounting pylon and a rear engine attachment.
Figure 2:
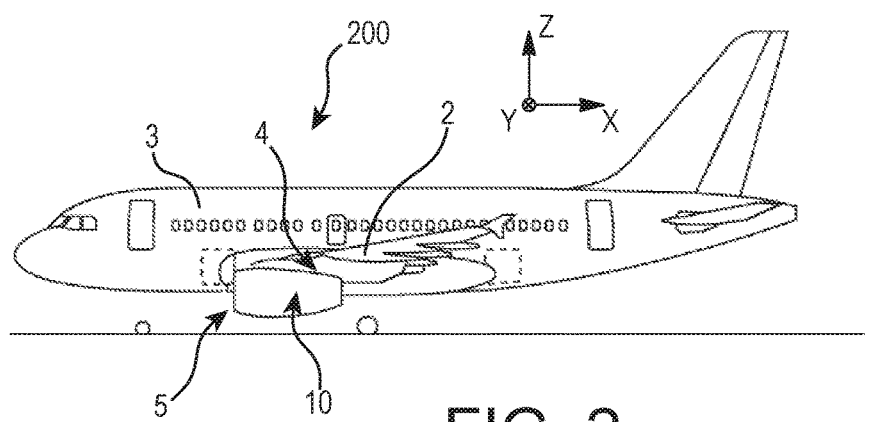
FIG. 2 shows an aircraft equipped with an engine assembly according to the invention.

With reference to FIG. 2, this shows an aircraft 200 comprising a fuselage 3 on which two wing elements 2 are fixed (only one is visible in FIG. 2), each wing element carrying an engine assembly 5 according to the invention. This engine assembly 5 includes a twin-shaft turbofan engine 10, such as a turbojet engine, and a pylon 4 for mounting the engine 10.

Figure 3:
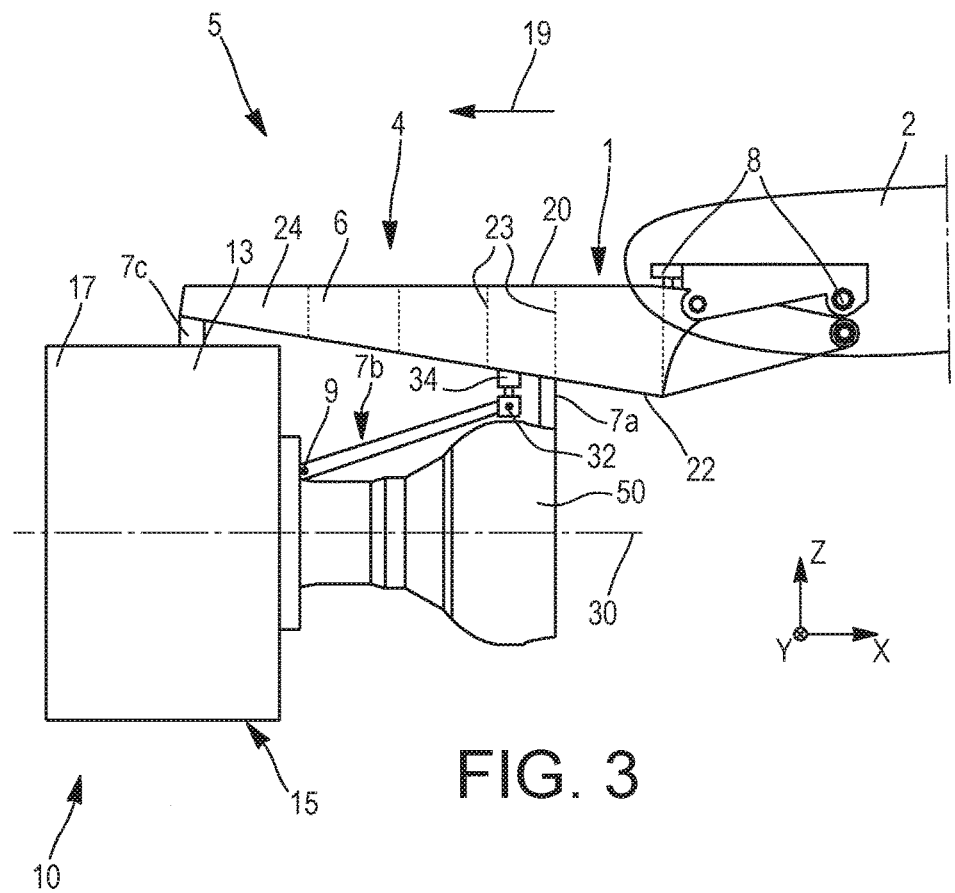
FIG. 3 shows a schematic side view of the engine assembly shown in the preceding figure, according to a preferred embodiment of the present invention.

With reference to FIG. 3, this shows in greater detail one of the engine assemblies 5. This figure shows the wing element 2, the turbojet engine 10 and the mounting pylon 4. Furthermore, means 8 for mounting the pylon 4 on the wing element 2, as well as means 7a, 7b, 7c for mounting the turbojet engine 10 on the pylon, are provided. These mounting means 7a-7c, the pylon 4 and the turbojet engine 10 form the engine assembly 5 according to the invention.

The mounting means 8, situated at the interface between the pylon 4 and the wing element 2, are formed in a conventional manner They will therefore not be described in greater detail.

As regards the mounting means 7a-7c, they comprise a set of rear engine attachments 7a, a thrust load transmission device 7b and a front engine attachment 7c. In this connection, it should be noted that the front end of the rigid structure 6 of the pylon, also called primary structure, is fixed via the front engine attachment 7c to an outer shroud 13 of an intermediate casing 15 of the turbojet engine 10. This shroud 13 extends in the axial extension of a fan casing 17, towards the rear, substantially with the same diameter. Alternatively, the front engine attachment 7c could be mounted on the fan casing 17, closer to the longitudinal axis 30 of the turbojet engine 10.

In the whole of the description below, according to the agreed meanings, the direction X corresponds to the longitudinal/axial direction of the pylon 4, which may be likewise equated with the longitudinal direction of the turbojet engine 10 and the engine assembly 5. This direction X is parallel to the longitudinal axis 30 of this turbojet engine 10. Moreover, the direction Y corresponds to the direction oriented transversely relative to the pylon 4 and may also be equated with the transverse direction of the turbojet engine 10 and the engine assembly 5, while the direction Z corresponds to the vertical direction or the height. These three directions X, Y and Z are orthogonal to each other and form a direct axis system.

Moreover, the terms "front" and "rear" are to be considered in relation to a direction of forward movement of the aircraft occurring following the thrust exerted by the turbojet engines 10, this direction being represented schematically by means of the arrow 19.

Still with reference to FIG. 3, it is pointed out that only the primary structure 6 of the mounting pylon 4 has been shown. The other component parts of this pylon 4 which have not been shown, such as the secondary structures ensuring separation and holding of the systems, while supporting the aerodynamic cowling, are parts known from the prior art. Consequently, a detailed description thereof will not be provided.

The primary structure 6 essentially comprises a "box," namely it is formed by the assembly of an upper spar 20 and lower spar 22 and two sides panels 24 (only one being visible because of the side view), these parts 20, 22, 24 being joined together by means of transverse inner stiffening ribs 23 which are usually oriented along parallel planes YZ. These ribs are preferably uniformly distributed in the box 6, along the X direction.

Returning to the attachment means 7a-7c, the thrust load transmission device 7b is also formed in a conventional manner by means of two side rods 9 for transmitting the loads in the X direction. These rods 9 are arranged symmetrically in relation to a mid-plane XZ of the engine assembly 5. They are hinged at their front end on an inner shroud of the intermediate casing 15 and hinged at their rear end on the two opposite lateral ends of a rudder bar 32, respectively. The rudder bar 32 is itself hinged at its center on a support element 34 fixed underneath the lower spar 22 of the rigid structure 6.

The support element 34 is situated at the front and close to the set of rear engine attachments 7a which connect an exhaust casing 50 of the turbojet engine 10 to the lower spar 22. Alternatively, the rudder bar 32 could be incorporated within the set of rear engine attachments 7a, without departing from the scope of the invention.

Figure 4:
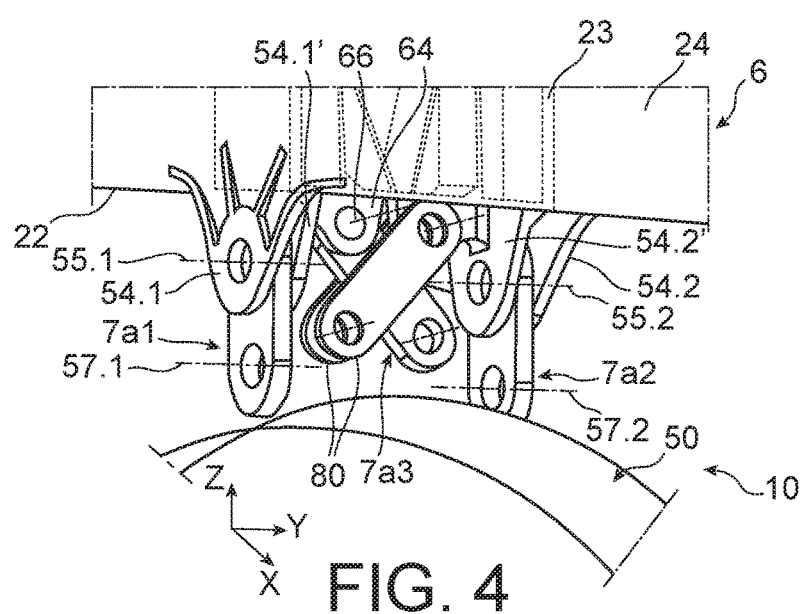
FIG. 4 shows a perspective view of the set of rear engine attachments used in the assembly shown in FIG. 3.
Figure 5:
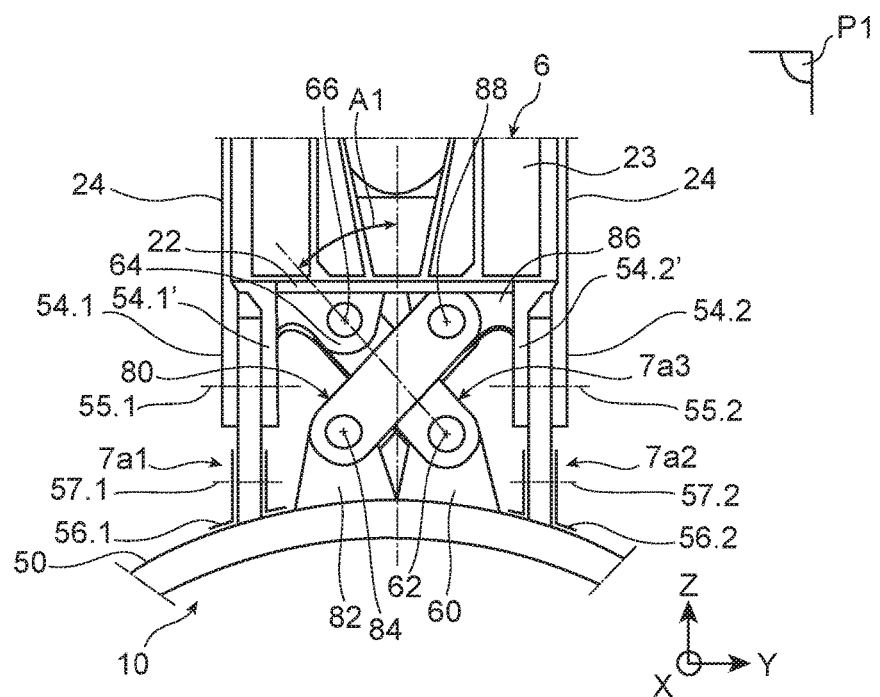
FIG. 5 shows a rear view of the set of rear engine attachments.
Figure 6:
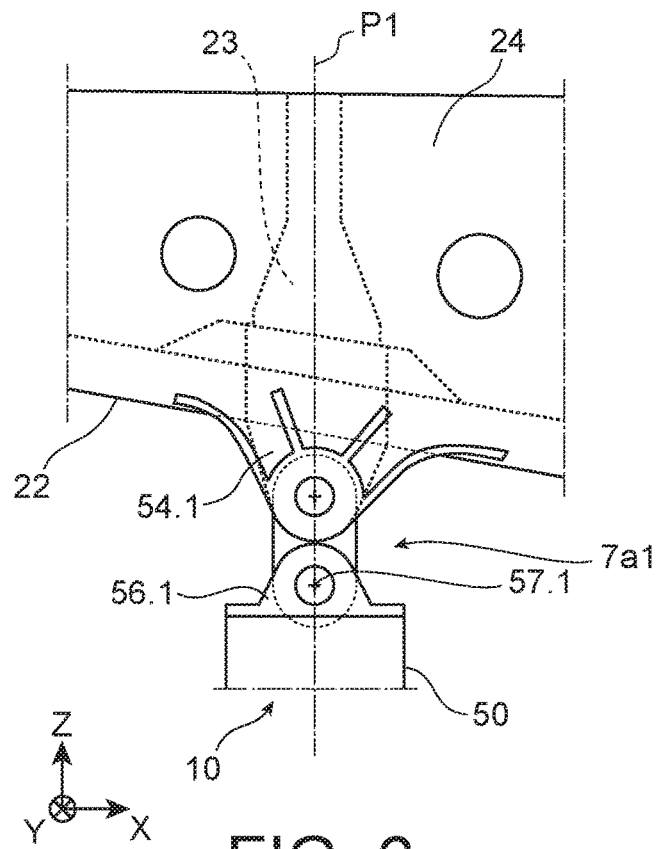
FIG. 6 shows a side view of the set of rear engine attachments.

With reference now to FIGS. 4 to 6, the design of the set of rear engine attachments 7a will now be described in detail. In order to transmit the loads under normal operating conditions, i.e., where there are no malfunctions, this set is formed by three separate attachments, namely a first shackle 7a1, a second shackle 7a2 and a third shackle 7a3 for transversely transmitting the loads. In a conventional manner in the technical sector considered, the shackles employed are substantially flat metal members which are elongated, while being relatively short compared to rods, and are hinged at their two opposite ends.

The rear part of the engine with which these attachments 7a1, 7a2, 7a3 cooperate corresponds to the exhaust casing 50 which forms the part of the engine closest to the primary structure 6 of the pylon, in the vertical direction Z.

The first shackle 7a1 is oriented in the Z direction so as to transmit solely the loads in this vertical direction. Moreover, it is arranged in a plane XZ. Its bottom end is hinged on a bracket 56.1 secured to the exhaust casing 50, preferably in the form of a clevis. The bracket 56.1 is mounted in a fixed manner or formed integrally with the exhaust casing 50. The hinging of this bottom end of the shackle 7a1 is performed by means of a hinging member defining a hinging axis 57.1 oriented along the Y direction.

As regards the top end of the shackle 7a1, it is hinged on a bracket 54.1 made as one piece with one of the two side panels 24. An additional bracket 54.1' made as one piece with one of the inner ribs 23 is provided facing and associated with this bracket 54.1, the bracket 54.1' having a form similar to that of the bracket 54.1. Together, these two brackets 54.1, 54.1' form a clevis on which the top end of the first shackle 7a1 is hinged, by means of a hinging member defining a hinging axis 55.1 also oriented along the Y direction.

The second shackle 7a2 is arranged symmetrically with the first shackle 7a1, along a longitudinal and vertical mid-plane of the engine assembly 5. Consequently, this second shackle 7a2 and its associated connection elements will not be further described. In the figures, the parts associated with this second shackle 7a2 and similar to the parts associated with the first shackle 7a1 have the same reference numbers, apart from the extension "1," which has been replaced by the extension "2." For example, the bracket for joining the shackle 7a2 to the box 6 has the reference number 55.2.

The two shackles 7a1, 7a2 are crossed by a transverse imaginary plane P1 of the engine assembly 5, this plane also crossing the third shackle 7a3 intended for transverse transmission of the loads, i.e., transmission of the loads in the Y direction. This third shackle 7a3 is more precisely arranged in the aforementioned plane P1 and is thus located at right angles to the first and second shackles 7a1, 7a2. In a front view such as that shown in FIG. 5, this shackle 7a3 is inclined in the Z direction, at an angle A1 of between 30° and 60°, and preferably in the region of 45°. This shackle 7a3 is solely intended to transmit the loads along the Y direction.

Its bottom end is hinged on a bracket 60 secured to the exhaust casing 50, preferably in the form of a clevis. The bracket 60 is mounted in a fixed manner or formed integrally with the exhaust casing 50. Nevertheless, one of the legs of the clevis 60 may be an additional bracket mounted on the other leg of the clevis, without departing form the scope of the invention.

The hinging of this bottom end of the shackle 7a3 is performed by means of a hinging member defining a hinging axis 62 oriented along the X direction. As regards the top end of the shackle 7a3, it is hinged on a bracket 64 in the form of a clevis made as one piece with the rib 23 also incorporating the other brackets 54.1 and 54.1'. Nevertheless, in this case also, one of the legs of the clevis 64 may be an additional bracket mounted on the other leg of the clevis, without departing from the scope of the invention.

It should be noted that all these brackets 64, 54.1, 54.1' locally cross the lower spar 22 of the box. The hinging of this top end of the shackle 7a3 is performed by means of a hinging member defining a hinging axis 66 which is also oriented along the X direction.

The three shackles 7a1-7a3 are able to ensure transmission of the loads under normal conditions, namely when there is no malfunctioning of these shackles. In order to solve this same problem of malfunctioning, as also indicated by the term "fail safe," each of these shackles may be duplicated, as may be the hinging members of these shackles. Moreover, the clevis formed by the two brackets 54.1, 54.1' as well as the clevis formed by the two brackets 54.2, 54.2' both ensure the "fail safe" function, since the two portions of each bracket are incorporated in separate parts.

In order to ensure the "fail safe" function of the shackles other than by duplicating them, alternatively one or more safety shackles 80 solely intended to be stressed when faulty danger conditions occur may be employed. These shackles may comprise, for example, one or two shackles 80, which are, for example, arranged axially on either side of the third shackle 7a3 and both inclined at an angle of 30° to 60° relative to the vertical direction. These safety shackles 80 intersect the third shackle 7a3, forming together an X shape in rear view, such as that shown in FIG. 5. Each of these shackles 80 is arranged in a plane YZ and has a bottom end hinged on a bracket 82 secured to the exhaust casing 50, preferably in the form of a clevis. The bracket 82 is mounted in a fixed manner or formed integrally with the exhaust casing 50. The hinging of this bottom end is performed by means of a hinging member defining a hinging axis 84 oriented along the X direction. As regards the top end of each shackle 80, it is hinged on a bracket 86 in the form of a clevis made as one piece with the rib 23 also incorporating the other brackets 64, 54.1 and 54.1', this rib 23 lying in the transverse plane P1. In this case also, the hinging of this top end of each safety shackle 80 is performed by means of a hinging member defining a hinging axis 88 also along the X direction.

Each safety shackle 80 is thus mounted so as to be inactive during normal operating conditions, but may be able to take over the vertical and transverse loads in the event of a faulty condition of the shackles 7a1-7a3.

Figure 7:
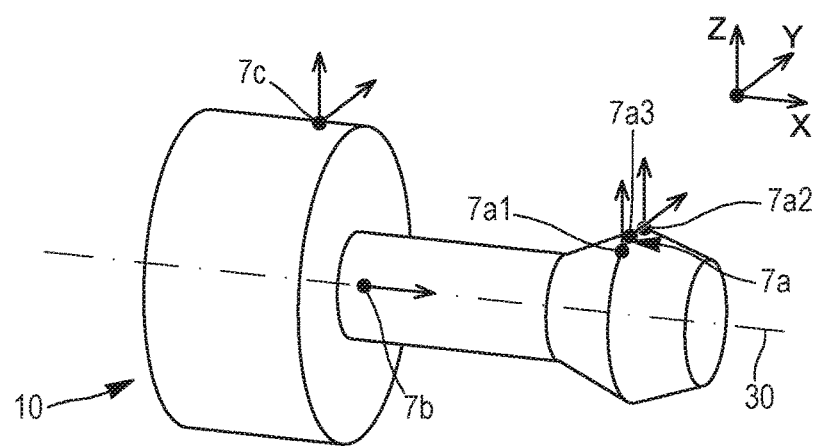
FIG. 7 is a view showing in schematic form transmission of the loads via the means for mounting the engine on the pylon.

The mounting means 7a-7c described above are the only parts of the engine assembly 5 for ensuring the transfer of loads between the turbojet engine 10 and the rigid structure 10 of the pylon. They form an isostatic load transmission system during normal operating conditions. In fact, as schematically shown in FIG. 7, the front engine attachment 7c ensures solely transmission of the loads in the Y and Z directions, while the device 7b ensures solely the transmission of the loads in the X direction. As regards the rear engine attachment 7a divided into three separate attachments, the first and second shackles 7a1, 7a2 each ensure solely the transmission of the loads in the Z direction, while the third shackle 7a3 ensures mainly the transmission of the loads in the Y direction.

Consequently, transmission of the loads acting along the X direction is performed by means of the device 7b, transmission of the loads acting along the Y direction is performed by means of the front engine attachment 7c and the third shackle 7a3, while the transmission of the loads acting along the Z direction is performed jointly by means of the front engine attachment 7c and the first and second shackles 7a1, 7a2.

Moreover, the transmission of the moment acting along the X direction is performed vertically by means of the first and second shackles 7a1, 7a2, the transmission of the moment acting along the Y direction is performed vertically by means of these two shackles 7a1, 7a2 together with the front engine attachment 7c, and the transmission of the moment acting along the Z direction is performed transversely by means of the third shackle 7a3 together with the front engine attachment 7c.

As mentioned above, in the event of malfunctioning of any one of the shackles 7a1-7a3, the safety shackles 80 take over in order to transmit the loads in the direction(s) affected by the malfunction.

Of course, various modifications may be made by the person skilled in the art to the invention which has been described, solely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly comprising:
   an engine,
   a pylon for mounting the engine on a structure of the aircraft,
   the pylon comprising a primary structure forming a box formed by lower spar and upper spars joined together by a plurality of transverse stiffening ribs situated inside the box, the box being closed laterally by two side panels,
   means for mounting the engine on the primary structure of the mounting pylon, wherein the mounting means include a set of rear engine attachments comprising:
      a first shackle hinged at one of its ends on a bracket secured to the engine and hinged at the other end on a bracket made as one piece with one of the two side panels, the first shackle being oriented along a vertical direction of the engine assembly and hinged on its associated brackets along hinging axes oriented along a transverse direction of the engine assembly;
      a second shackle hinged at one of its ends on a bracket secured to the engine and hinged at the other end on a bracket made as one piece with the other one of the two side panels, the second shackle being oriented along the vertical direction of the engine assembly and hinged on its associated brackets along hinging axes oriented along the transverse direction of the engine assembly, the first and second shackles being arranged so as to be crossed by a vertical and transverse plane of the engine assembly; and
      a third shackle for transverse transmission of the loads, inclined relative to the vertical direction and crossed by the vertical and transverse plane, the third shackle being hinged at one of its ends on a bracket secured to the engine and hinged at the other end on a bracket secured to the primary structure of the pylon.

2. The aircraft engine assembly according to claim 1, wherein the third shackle is inclined at about 30° to 60° relative to the vertical direction.

3. The aircraft engine assembly according to claim 1, wherein the third shackle is hinged on associated brackets along hinging axes oriented along a longitudinal direction of the engine assembly.

4. The aircraft engine assembly according to claim 1, wherein, for each of the first and second shackles, the end which is hinged on the shackle made as one piece with the associated side panel, is also hinged on an additional bracket secured to the primary structure of the pylon, the bracket and the additional bracket facing each other so as to form a clevis.

5. The aircraft engine assembly according to claim 4, wherein the additional bracket is made as one piece with one of the transverse stiffening ribs of the box.

6. The aircraft engine assembly according to claim 1, wherein the bracket secured to the primary structure of the pylon, on which the third shackle is hinged, is made as one piece with one of the transverse stiffening ribs of the box.

7. The aircraft engine assembly according to claim 1, wherein the bracket secured to the primary structure of the pylon, on which the third shackle is hinged, is made as one piece with one of the transverse stiffening ribs of the box and is in the form of a clevis.

8. The aircraft engine assembly according to claim 1, wherein the first, second and third shackles are joined to an exhaust casing of the engine.

9. The aircraft engine assembly according to claim 1, wherein the set of rear engine attachments also comprises at least one safety shackle which is only stressed in the event of a faulty condition of at least one of the first, second and third shackles.

10. The aircraft engine assembly according to claim 9, wherein at least one safety shackle intersects the third shackle so as to form an X-shaped assembly in rear view.

11. The aircraft engine assembly according to claim 1, wherein the mounting means also comprise a front engine attachment as well as a device for transmission of the thrust loads oriented along the longitudinal direction of the engine assembly.

12. The aircraft engine assembly according to claim 11, wherein the set of rear engine attachments, the front engine attachment and the thrust load transmission device are engine mounting means forming an isostatic load transmission system.

13. The aircraft engine assembly according to claim 11, wherein the thrust load transmission device comprises:
   a support element fixed to the box on the outside of the latter;
   two side rods for transmission of the thrust loads; and
   a rudder bar hinged on the support element, the two side rods being hinged on the two opposite ends of the rudder bar, respectively.

14. The aircraft engine assembly according to claim 13, wherein the support element is arranged at the front in relation to the set of rear engine attachments.

15. The aircraft engine assembly according to claim 1, wherein the engine is a twin-shaft turbofan engine.

16. An aircraft comprising:
   at least one engine assembly comprising:
      an engine,
      a pylon for mounting the engine on a structure of the aircraft,
      the pylon comprising a primary structure forming a box formed by lower spar and upper spars joined together by a plurality of transverse stiffening ribs situated inside the box, the box being closed laterally by two side panels,
   means for mounting the engine on the primary structure of the mounting pylon, wherein the mounting means include a set of rear engine attachments comprising:
      a first shackle hinged at one of its ends on a bracket secured to the engine and hinged at the other end on a bracket made as one piece with one of the two side panels, the first shackle being oriented along a vertical direction of the engine assembly and hinged on its associated brackets along hinging axes oriented along a transverse direction of the engine assembly;
      a second shackle hinged at one of its ends on a bracket secured to the engine and hinged at the other end on a bracket made as one piece with the other one of the two side panels, the second shackle being oriented along the vertical direction of the engine assembly and hinged on its associated brackets along hinging axes oriented along the transverse direction of the engine assembly, the first and second shackles being arranged so as to be crossed by a vertical and transverse plane of the engine assembly; and
      a third shackle for transverse transmission of the loads, inclined relative to the vertical direction and crossed by the vertical and transverse plane, the third shackle being hinged at one of its ends on a bracket secured to the engine and hinged at the other end on a bracket secured to the primary structure of the pylon.

* * * * *